United States Patent [19]

Sato et al.

[11] Patent Number: 5,171,364

[45] Date of Patent: Dec. 15, 1992

[54] PROCESS FOR PREPARING CONDUCTIVE ACICULAR ZINC OXIDE

[75] Inventors: Norihiro Sato; Takao Hayashi, both of Shimoneseki; Nobuyoshi Kasahara, Sayama, all of Japan; Wolf-Dieter Griebler, Moers, Fed. Rep. of Germany; Jörg Hocken, Meerbusch, Fed. Rep. of Germany; Günther Rudolph, Neuberg, Fed. Rep. of Germany

[73] Assignees: Mitsui Mining & Smelting Co. Ltd., Tokyo, Japan; Metallgesellschaft Aktiengesellschaft, Frankfurt am Main, Fed. Rep. of Germany

[21] Appl. No.: 792,015

[22] Filed: Nov. 13, 1991

[30] Foreign Application Priority Data

May 28, 1991 [JP] Japan ................... 3-150852

[51] Int. Cl.⁵ ............................................. C04B 14/30
[52] U.S. Cl. .................................. 106/425; 252/518; 106/426
[58] Field of Search ............... 106/425, 426; 524/912; 252/518; 423/102, 622

[56] References Cited

U.S. PATENT DOCUMENTS 5,102,650 4/1992 Hayashi et al. ................... 423/622

Primary Examiner—Karl Group
Assistant Examiner—Chris Gallo
Attorney, Agent, or Firm—Buckman and Archer

[57] ABSTRACT

A process for preparing a conductive, acicular zinc oxide, comprising the steps of: preparing a zinc oxide slurry comprising an acicular zinc oxide, a salt of at least one metal selected from the group consisting of aluminum, gallium, indium and tin and an aqueous solution of an alkali metal hydroxide and having a pH value maintained at 10 to 13, adjusting the pH value of said zinc oxide slurry to 5 to 9 while stirring, aging the slurry, separating the zinc oxide present in the slurry by filtration, washing and drying the separated zinc oxide, and then firing the dried zinc oxide at 500° to 700° C. in a reducing atmosphere.

1 Claim, No Drawings

PROCESS FOR PREPARING CONDUCTIVE ACICULAR ZINC OXIDE

BACKGROUND OF THE INVENTION

1. Field of the Invention

The present invention relates to a process for preparing a conductive, acicular zinc oxide. More particularly, the present invention is concerned with a process for preparing an acicular zinc oxide which has an improved conductivity while maintaining the whiteness on a high level and is useful as a pigment to be blended into a coating composition, a resin, a rubber and a fiber in applications where electrification and static charge buildup must be prevented.

2. Prior Art

Zinc oxide is useful as a pigment to be blended into a coating composition, a resin, a rubber and a fiber, and especially a zinc oxide having excellent conductivity has been desired in applications where electrification and static charge buildup must be prevented. Among such zinc oxides, those in a non-branched acicular form (needle-like) or in a branched acicular form (tetrapod-like) (hereinafter collectively referred to as an acicular zinc oxide) are superior to a granular zinc oxide in that a conductivity network is created by the addition thereof in a small amount. Accordingly, a zinc oxide which is not only high in conductivity but also acicular has been desired in the art.

Japanese Patent Application Laid-Open Gazette No. (Hei.)3-28125 (28125/1991) discloses a process developed by the present inventors for preparing an acicular, conductive zinc oxide. This process comprises neutralizing a solution containing an alkali zincate compound and a salt of a specific metal, such as aluminum, with a mineral acid to obtain precipitates, and subjecting the precipitates to dehydration and firing in a reducing atmosphere. The acicular, conductive zinc oxide obtained by such process has fairly good characteristics, but this process has a problem in productivity, because a large amount of alkali is required to keep zinc dissolved and a large amount of acid is required to neutralize the solution. Further, in this process, it is difficult to impart conductivity to the acicular zinc oxide previously prepared by conventional processes, such as the dry process and the wet process.

Japanese Patent Application Laid-Open Gazette No. (Hei.)3-60429 (60429/1991) discloses another process for preparing a conductive, acicular zinc oxide. This process comprises adding an aqueous solution of ammonium carbonate and an aqueous solution of aluminum sulfate to a dispersion of an acicular zinc oxide, followed by stirring for a predetermined period of time and dehydration and firing in a reducing atmosphere. However, the conductive, acicular zinc oxide prepared by this process has conductivity and whiteness which are both unsatisfactory, and hence further improvement has been desired.

SUMMARY OF THE INVENTION

The present invention has been made in view of the above-described problems of the prior art, and an object of the present invention is to provide a process for efficiently preparing an acicular zinc oxide having satisfactory conductivity and a whiteness maintained on a high level.

The present inventors have made intensive studies with a view to attaining the above-described object. As the result of their studies, it has been found that the above-described problems can be solved by preparing a zinc oxide slurry comprising an acicular zinc oxide, a salt of a specific metal and an aqueous solution of an alkali metal hydroxide and having a pH value of 10 to 13, adjusting the pH value of the slurry to 5 to 9 while stirring, followed by aging and conducting dehydration, and firing under specific conditions. The present invention is based on this finding.

The process for preparing a conductive, acicular zinc oxide of the present invention is characterized in that it comprises the steps of: preparing a zinc oxide slurry comprising an acicular zinc oxide, a salt of at least one metal selected from the group consisting of aluminum, gallium, indium and tin and an aqueous solution of an alkali metal hydroxide and having a pH value maintained at 10 to 13, adjusting the pH value of said zinc oxide slurry to 5 to 9 while stirring, aging the slurry, separating the zinc oxide present in the slurry by filtration, washing and drying the separated zinc oxide, and then firing the dried zinc oxide at 500° to 700° C. in a reducing atmosphere.

Zinc oxide (ZnO) to be used as the starting material in the present invention is not limited as long as it is an acicular zinc oxide having a shape of a needle-like or a tetrapod-like, and it may be prepared by either of the dry process and the wet process.

In the present invention, as a dopant, at least one metal selected from the group consisting of aluminum, gallium, indium and tin is used in the form of a salt, preferably a chloride, a sulfate, a nitrate or an acetate. The dopant is preferably used in an amount of from 0.01 to 1.0 part by weight (metal component) based on 100 parts by weight of zinc oxide. When the amount of the dopant is smaller than the above-described lower limit, the conductivity is likely to be unsatisfactory. On the other hand, if it is added in an amount which is large than the above-described upper limit, there is no additional effect and the whiteness is likely to lower.

The alkali metal hydroxide to be used in the present invention includes potassium hydroxide and sodium hydroxide. The amount of the alkali metal hydroxide is selected so as to allow the pH value of the below described zinc oxide slurry to assume a predetermined value (pH 10 to 13).

In the present invention, a zinc oxide slurry which comprises the above-described acicular zinc oxide, the above-described metal salt and an aqueous solution of the above-described alkali metal hydroxide is prepared. In the preparation, it is necessary to maintain the pH value of the obtained zinc oxide slurry at 10 to 13.

When the pH value of the zinc oxide slurry exceeds 13, zinc oxide is dissolved disadvantageously. Only when the pH value is 13 or below, the acicular zinc oxide is present in the slurry form while maintaining the original shape and at least a major part of the dopant is present in the form of ions and uniformly dispersed in the zinc oxide slurry.

On the other hand, when the pH value of the zinc oxide slurry is lower than 10 from the beginning, as soon as the above-described metal salt is added to the aqueous solution, most of the dopant is precipitated to form bulky granules, so that it is not uniformly dispersed in the zinc oxide slurry. Accordingly, if the zinc oxide in such a slurry is subjected to the following firing, no satisfactory conductivity can be obtained.

In the present invention, it is preferred to choose the pH value of the zinc oxide slurry depending on the type of the employed dopant so as to allow the dopant to be present wholly in the form of ions. An especially preferred pH value is 12 to 13 when the dopant is aluminum, 11 to 12 when the dopant is gallium, 12 to 13 when the dopant is indium, and 12 to 13 when the dopant is tin.

The concentration of the acicular zinc oxide in the zinc oxide slurry according to the present invention is preferably from 100 to 800 g/l. The temperature is preferably from 20° to 80° C. Further, it is preferred to agitate the zinc oxide slurry for 30 to 120 min. after the preparation.

A process for preparing the zinc oxide slurry in the present invention is not particularly limited. A salt of at least one metal selected from the group consisting of aluminum, gallium, indium and tin and an acicular zinc oxide may be added in predetermined amounts to an aqueous solution of an alkali metal hydroxide having a predetermined concentration and agitated. However, the following method is generally preferred.

Specifically, a suspension is prepared which contains predetermined amounts of acicular zinc oxide and alkali metal hydroxide and has a pH value of from 10 to 13, preferably from 11 to 12.5. Separately, a predetermined amount of the above-described metal salt is added to an aqueous solution of an alkali metal hydroxide to prepare a dopant solution having a pH value of from 11 to 14. Subsequently, the dopant solution is added in a predetermined amount to the zinc oxide slurry and agitated to prepare the zinc oxide slurry according to the present invention. In the preparation, it is preferred to adjust the pH value to the above-described preferred range, depending on the type of the dopant. In this adjustment, it is preferred that the concentration of the acicular zinc oxide in the above-described suspension be from 100 to 800 g/l and that the dopant (metal component) concentration of the dopant solution be from 0.01 to 1.0 mol/l.

Thereafter, in the present invention, a lowering in the pH value of the zinc oxide slurry is started under stirring toward 5 to 9, preferably 6 to 8, and most preferably around 7. In accordance with the lowering in the pH value of the zinc oxide slurry, the dopant ions dispersed in the slurry are precipitated as a hydroxide, an oxide or a hydrate, and the precipitates are aged under such conditions.

When the pH value of the zinc oxide slurry is adjusted to 5 to 9 according to the present invention, the dissolved dopant begins all at once to be precipitated. At that time, because the occurrence of crystal nuclei, rather than the growth of granules, is dominant, the precipitated dopant forms fine granules. Moreover, because the isoelectric point of zinc oxide (a state where the surface is neither positively nor negatively charged, i.e., in a non-charged state) is around a pH value of 9 while the isoelectric point of the fine granules of a dopant, such as aluminum hydroxide or stannic oxide, is around a pH value of 5, the surface voltages of the zinc oxide and the fine dopant granules respectively have relatively positive and negative charges at a pH value of between 5 and 9, preferably around 7. Therefore, the zinc oxide and the fine dopant granules electrically attract each other to be brought into close contact to form a bond. As a result, the surface of the acicular zinc oxide which has a complicated morphology is uniformly covered by the fine dopant granules.

On the other hand, when the pH value of the zinc oxide slurry is outside the range of from 5 to 9, the zinc oxide and the precipitated dopant do not electrically attract each other to form a simple mixture. Consequently, if such a zinc oxide, together with the precipitated dopant, is subjected to the following firing, no zinc oxide having satisfactory conductivity can be obtained.

In the present invention, the method of lowering the pH value of the zinc oxide slurry is not particularly limited. For example, it may comprise adding an aqueous acid solution such as diluted hydrochloric acid or diluted nitric acid. The temperature in the aging of the zinc oxide slurry is preferably from 20° to 80° C., and the aging time is preferably from 30 to 120 min.

Thereafter, in the present invention, the zinc oxide present in the zinc oxide slurry is subjected to filtration, washing, drying, and firing in a reducing atmosphere to obtain the conductive, acicular zinc oxide. The methods of the filtration, washing and drying are not particularly limited, and conventional methods may be employed.

The firing is conducted at 500° to 700° C., preferably 500° to 600° C. in a reducing atmosphere, such as a hydrogen atmosphere. If the firing temperature exceeds 700° C., the whiteness of the zinc oxide after firing is likely to be poor and the aspect ratio is likely to be low unfavorably. When the temperature is particularly 600° C. or below, it is possible to obtain an acicular zinc oxide which has excellent conductivity with a whiteness maintained on a high level. On the other hand, when the baking temperature is below 500° C., the dispersion of the dopant in the zinc oxide lattice is not satisfactory, and hence no zinc oxide having satisfactory conductivity can be obtained. Although the firing time is not particularly limited as long as it is sufficient for dispersing the dopant in the zinc oxide lattice, it is preferred to be from 30 to 120 min.

As described above, the process of the present invention enables a conductive, acicular zinc oxide having a satisfactory conductivity and a sufficiently maintained acicular shape to be efficiently prepared. Further, the conductive, acicular zinc oxide has a good whiteness.

Therefore, the conductive, acicular zinc oxide according to the present invention is very useful as a pigment or the like to be blended into a coating composition, a resin, a rubber and a fiber in applications where electrification and static charge buildup must be prevented, which renders the process of the present invention important in such applications from the industrial viewpoint.

DESCRIPTION OF THE PREFERRED EMBODIMENTS

The present invention will now be described in more detail by referring to the following Examples and Comparative Examples.

EXAMPLE 1

1200 g of tetrapod-like zinc oxide (having an average length of 7 $\mu$m, an average thickness of 0.7 $\mu$m, a volume resistivity of $10^{10}$ $\Omega$.cm and an aspect ratio of 10) was added to water to prepare 10 l of a suspension and the suspension was stirred at 60° C. for 1 hr. A 7.3M aqueous potassium hydroxide solution was added to the suspension to adjust the pH value to 12 and the suspension was further stirred at 60° C. for 30 min. Separately, aluminum chloride was added to a 5M aqueous potassium hydroxide solution and the mixture was stirred at 60° C. to prepare a dopant solution (pH: about 14) having an aluminum concentration of 0.5 mol/l (13.5 g/l). The dopant solution was added to the suspension to prepare a zinc oxide slurry listed in Table 1. In the preparation, the pH value of the slurry was adjusted to 12.2.

Then, the zinc oxide slurry thus prepared was stirred at 60° C. for 1 hr and 0.5M diluted hydrochloric acid was gradually added thereto while stirring to lower the pH value of the zinc oxide slurry to 7.1. After the slurry was further aged at 60° C. for 1 hr, zinc oxide contained in the zinc oxide slurry was subjected to filtration, washing and drying and then fired in a hydrogen atmosphere at 600° C. for 1 hr.

Various properties of the resultant conductive, acicular zinc oxide were measured by the following methods. The results are given in Table 1.

Volume resistivity

The conductive, acicular zinc oxide was press-molded under a pressure of 2 ton/cm$^2$ into a sample, and the volume resistivity of the sample was measured with a low resistance measuring apparatus (Loresta-AP; mfd. by Mitsubishi Petrochemical Co., Ltd.).

Specific surface area

The specific surface area was measured by the BET one-point method through the utilization of nitrogen gas adsorption.

Shape

The outer shape was observed under a scanning electron microscope (SEM) and compared with that of the starting zinc oxide.

Aspect ratio

The aspect ratio was measured on 20 conductive, acicular zinc oxide particles under a scanning electron microscope (SEM), and the average value was calculated.

Whiteness

The L value was measured with a color computer (model SM-5; mfd. by Suga Test Instruments Co., Ltd.), and the obtained value was regarded as the whiteness.

The conductive, acicular zinc oxide prepared in Example 1 was chemically analyzed and found to have an aluminum content of 1.0 part by weight based on 100 parts by weight of zinc oxide.

Further, the conductive, acicular zinc oxide prepared in Example 1 was subjected to X-ray diffraction analysis. As a result, the peak positions and peak intensities were substantially in agreement with those of the starting zinc oxide. Therefore, it was confirmed that the conductive, acicular zinc oxide had the same crystallinity as that of the starting zinc oxide and was a composite oxide comprising zinc oxide and aluminum dissolved therein in a solid solution form.

Furthermore, the observation under a SEM has revealed that the resultant conductive, acicular zinc oxide has substantially the same shape as that of the starting zinc oxide.

EXAMPLES 2 AND 3

A conductive, acicular zinc oxide was prepared in a similar manner to that of Example 1, except that the final pH value (after lowering) of the zinc oxide slurry was 6.2 (Example 2) or 7.8 (Example 3) instead of 7.1.

Various properties of the resultant conductive, acicular zinc oxides were measured in a similar manner to that of Example 1. The results are given in Table 1.

EXAMPLES 4 TO 7

Zinc oxide slurries listed in Table 1 were prepared in a similar manner to that of Example 1, except that gallium chloride (Example 4), indium chloride (Example 5), stannic chloride (Example 6), and gallium chloride and stannic chloride (Example 7) were used instead of aluminum chloride, respectively. Conductive, acicular zinc oxides were prepared through the use of these zinc oxide slurries in a similar manner to that of Example 1.

Various properties of the conductive, acicular zinc oxides thus prepared were measured in a similar manner to that of Example 1. The results are given in Table 1.

EXAMPLES 8 AND 9

A conductive, acicular zinc oxide was prepared in the same manner as that of Example 1, except that the firing temperature was 500° C. (Example 8) or 700° C. (Example 9) instead of 600° C.

Various properties of the conductive, acicular zinc oxides thus prepared were measured in a similar manner to that of Example 1. The results are given in Table 1.

EXAMPLE 10

A conductive, acicular zinc oxide was prepared in a similar manner to that of Example 1, except that a needle-like zinc oxide (having an average length of 0.4 μm, an average thickness of 0.02 μm, a volume resistivity of $10^{10}$ Ω.cm and an aspect ratio of 25) was used instead of the tetrapod-like zinc oxide.

Various properties of the conductive, acicular zinc oxide thus prepared were measured in a similar manner to that of Example 1. The results are given in Table 1.

COMPARATIVE EXAMPLE 1

1200 g of the same tetrapod-like zinc oxide as that of Example 1 was added to water to prepare 10 l of a suspension, and the suspension was stirred at 60° C. for 1 hr. A 25% aqueous ammonia solution was added to the suspension. As a result, there was no increase in the pH value from 9.7. Therefore, the addition of the ammonia solution was stopped when the amount reached 2 l and the suspension was further stirred at 60° C. for 30 min.

Then, the same dopant solution as that of Example 1 was added to the above-described suspension to prepare a zinc oxide slurry having a pH value of 9.8, listed in Table 1, and the slurry as prepared was directly aged at 60° C. for 1 hr without conducting any neutralization treatment. After the completion of the aging, the zinc oxide contained in the zinc oxide slurry was separated by filtration, washed, dried and fired in a similar manner to that of Example 1 to prepare a conductive, acicular zinc oxide.

Various properties of the conductive, acicular zinc oxide thus prepared were measured in a similar manner to that of Example 1. The results are given in Table 1.

COMPARATIVE EXAMPLE 2

A conductive, acicular zinc oxide was prepared in a similar manner to that of Comparative Example 1, except that the firing temperature was 800° C. instead of 600° C.

Various properties of the conductive, acicular zinc oxide thus prepared were measured in a similar manner to that of Example 1. The results are given in Table 1.

The conductive, acicular zinc oxide was subjected to X-ray diffraction analysis. As a result, it was found that the peak intensity was lower than that of the starting zinc oxide, indicating that the crystallinity lowered.

TABLE 1

| Ex. and Comp. Ex. | Conditions for zinc oxide slurry | | | | | | Firing temp. °C. | Properties of zinc oxide | | | |
|---|---|---|---|---|---|---|---|---|---|---|---|
| | amt. of dopant *1 | | | | pH | | | volume resistivity $\Omega \cdot cm$ | specific surface area | aspect ratio | whiteness L |
| | Al | Ga | In | Sn | before lowering | after lowering | | | | | |
| Ex. 1 | 1.0 | — | — | — | 12.2 | 7.1 | 600 | 10 | 1.8 | 10 | 97 |
| Ex. 2 | 1.0 | — | — | — | 12.2 | 6.2 | 600 | 22 | 1.8 | 10 | 97 |
| Ex. 3 | 1.0 | — | — | — | 12.2 | 7.8 | 600 | 18 | 1.8 | 10 | 97 |
| Ex. 4 | — | 0.5 | — | — | 11.5 | 7.1 | 600 | 1 | 1.8 | 10 | 99 |
| Ex. 5 | — | — | 0.5 | — | 12.2 | 7.1 | 600 | 500 | 1.8 | 10 | 95 |
| Ex. 6 | — | — | — | 0.5 | 12.2 | 7.1 | 600 | 300 | 1.8 | 10 | 95 |
| Ex. 7 | — | 0.04 | — | 0.2 | 12.2 | 7.1 | 600 | 150 | 1.8 | 10 | 93 |
| Ex. 8 | 1.0 | — | — | — | 12.2 | 7.1 | 500 | 30 | 1.8 | 10 | 97 |
| Ex. 9 | 1.0 | — | — | — | 12.2 | 7.1 | 700 | 20 | 1.5 | 10 | 93 |
| Ex. 10 | 1.0 | — | — | — | 12.2 | 7.1 | 600 | 20 | 3.0 | 25 | 95 |
| Comp. Ex. 1 | 1.0 | — | — | — | 9.8 | — | 600 | 500 | 1.8 | 10 | 90 |
| Comp. Ex. 2 | 1.0 | — | — | — | 9.8 | — | 800 | 600 | 1.0 | 8 | 80 |
| Comp. Ex. 3 | — | 0.5 | — | — | 9.8 | — | 800 | 100 | 1.0 | 8 | 88 |
| Comp. Ex. 4 | — | — | 0.5 | — | 9.8 | — | 800 | 1000 | 1.0 | 8 | 87 |
| Comp. Ex. 5 | — | — | — | 0.5 | 9.8 | — | 800 | 800 | 1.0 | 8 | 85 |
| Comp. Ex. 6 | 1.0 | — | — | — | 9.0 | — | 800 | 600 | 1.8 | 10 | 80 |

Note: *1: parts by weight of dopant (metal component) based on 100 parts by weight of zinc oxide

COMPARATIVE EXAMPLES 3 TO 5

Zinc oxide slurries listed in Table 1 were prepared in a similar manner to that of Comparative Example 1, except that gallium chloride (Comparative Example 3), indium chloride (Comparative Example 4) and stannic chloride (Comparative Example 5) were used instead of aluminum chloride, respectively. Conductive, acicular zinc oxides were prepared in a similar manner to that of Comparative Example 1, except that these zinc oxide slurries were used and the baking temperature was 800° C.

Various properties of the conductive, acicular zinc oxides thus prepared were measured in a similar manner to that of Example 1. The results are given in Table 1.

COMPARATIVE EXAMPLE 6

3000 g of the same tetrapod-like zinc oxide as that of Example 1 was added to water to prepare 6 l of a suspension, and the suspension was stirred at room temperature for 2 hr.

Separately, 900 g of ammonium carbonate (20.7% NH₃) (1st grade reagent) was added to water to prepare 15 l of an aqueous ammonium carbonate solution. Separately, aluminum sulfate octadecahydrate (14.4% Al) was added to water to prepare 1.5 l of an aqueous aluminum sulfate solution, which was poured into the aqueous ammonium carbonate solution, and the mixture was stirred at room temperature for 30 min. The pH value of the liquid mixture was 9.

Then, the liquid mixture was added to the above-described suspension to prepare a zinc oxide slurry listed in Table 1, and the zinc oxide slurry was further stirred at 60° C. for 1 hr.

Subsequently, the zinc oxide contained in the zinc oxide slurry was separated by filtration, washed, dried and fired in a hydrogen atmosphere at 800° C. for 1 hr.

Various properties of the conductive, acicular zinc oxides thus prepared were measured in a similar manner to that of Example 1. The results are given in Table 1.

As is apparent from the results of the Examples and Comparative Examples given in Table 1, the conductive, acicular zinc oxides of Examples 1 to 10 according to the present invention had a high conductivity, a sufficiently maintained acicular shape and a good whiteness.

By contrast, the conductive, acicular zinc oxide of Comparative Example 1 wherein use was made of an aqueous ammonia solution and the pH value of the zinc oxide slurry was outside the scope of the present invention was inferior to the corresponding conductive, acicular zinc oxide of Example 1 in the conductivity and whiteness.

Further, the conductive, acicular zinc oxides of Comparative Examples 2 to 5 wherein use was made of an aqueous ammonia solution, the pH of the zinc oxide slurry was outside the scope of the present invention and the firing temperature was higher than that specified in the present invention were inferior to the corresponding conductive, acicular zinc oxides of Examples 1 and 4 to 6 in the conductivity and whiteness as well as in the aspect ratio.

The conductive, acicular zinc oxide of Comparative Example 6 prepared according to the method described in the Japanese Patent Application Laid-Open Gazette No. (Hei.) 3-60429 (60429/1991) was inferior to that of Example 1 in the conductivity and whiteness.

What is claimed is:

1. A process for preparing a conductive, acicular zinc oxide, comprising the steps of: preparing a zinc oxide slurry comprising an acicular zinc oxide, a salt of at least one metal selected from the group consisting of aluminum, gallium, indium and tin and an aqueous solution of an alkali metal hydroxide and having a pH value maintained at 10 to 13, adjusting the pH value of said zinc oxide slurry to 5 to 9 while stirring, aging the slurry, separating the zinc oxide present in the slurry by filtration, washing and drying the separated zinc oxide, and then firing the dried zinc oxide at 500° to 700° C. in a reducing atmosphere.

* * * * *